(12) United States Patent
Metcalf et al.

(10) Patent No.: US 9,305,087 B2
(45) Date of Patent: Apr. 5, 2016

(54) METHOD AND APPARATUS FOR ACQUIRING CONTENT-BASED CAPITAL VIA A SHARING TECHNOLOGY

(75) Inventors: Crysta Metcalf, Cary, IL (US); Frank Bentley, Palatine, IL (US)

(73) Assignee: Google Technology Holdings, Mountain View, CA (US)

( * ) Notice: Subject to any disclaimer, the term of this patent is extended or adjusted under 35 U.S.C. 154(b) by 500 days.

(21) Appl. No.: 11/961,489

(22) Filed: Dec. 20, 2007

(65) Prior Publication Data

US 2009/0164624 A1  Jun. 25, 2009

(51) Int. Cl.
| | |
|---|---|
| G06F 15/173 | (2006.01) |
| G06F 17/30 | (2006.01) |
| G06F 21/31 | (2013.01) |
| G06F 17/00 | (2006.01) |

(52) U.S. Cl.
CPC .... *G06F 17/30861* (2013.01); *G06F 17/30038* (2013.01); *G06F 17/3082* (2013.01); *G06F 17/30749* (2013.01); *G06F 17/30752* (2013.01); *G06F 17/30817* (2013.01); *G06F 17/60* (2013.01); *G06F 21/316* (2013.01)

(58) Field of Classification Search
CPC .............. G06F 17/30861; G06F 17/60; G06F 17/30749; G06F 17/30752; G06F 17/30817; G06F 17/3082; G06F 17/30038; G06F 21/316
See application file for complete search history.

(56) References Cited

U.S. PATENT DOCUMENTS

| | | | |
|---|---|---|---|
| 6,539,375 B2 | 3/2003 | Kawasaki | |
| 2004/0199527 A1* | 10/2004 | Morain et al. | 707/100 |
| 2004/0249700 A1* | 12/2004 | Gross | 705/10 |
| 2005/0125222 A1 | 6/2005 | Brown et al. | |
| 2005/0138139 A1* | 6/2005 | Jain et al. | 709/217 |
| 2005/0188328 A1 | 8/2005 | Sezan et al. | |
| 2005/0193054 A1 | 9/2005 | Wilson et al. | |
| 2006/0042483 A1* | 3/2006 | Work et al. | 101/91 |

FOREIGN PATENT DOCUMENTS

| | | |
|---|---|---|
| CN | 101076826 A | 11/2007 |
| EP | 1460512 A2 | 9/2004 |
| JP | 07-200578 A | 8/1995 |
| KR | 10-2001-0113258 A | 12/2001 |

(Continued)

OTHER PUBLICATIONS

So Young Doo, "PCT International Search Report and Written Opinion," WIPO, ISA/KR, Korean Intellectual Property Office, Daejeon, Republic of Korea, Jun. 29, 2009, 11 pages.

(Continued)

*Primary Examiner* — Patrice Winder
*Assistant Examiner* — Nam Tran

(57) ABSTRACT

A server [115] or client-based content storage unit includes a communication device [300] to receive data corresponding to a transfer of at least one of media content and a link to the media content, from a first user [120] to a second user [125]. The communication device [300] also receives data corresponding to usage of the media content by the second user [125], and transmits some representation of a content capital to the first user [120]. A content usage aggregator [315] receives information corresponding to the usage of the media content by the second user [125]. A content usage evaluator [310] determines the content capital based on an aggregation of monitored use of the media content by the second user [125].

20 Claims, 6 Drawing Sheets

(56) References Cited

FOREIGN PATENT DOCUMENTS

| | | |
|---|---|---|
| KR | 10-2004-0000714 A | 1/2004 |
| KR | 10-2007-0079211 A | 8/2007 |
| KR | 10-2007-0091834 A | 9/2007 |
| WO | 2006040405 A1 | 4/2006 |

OTHER PUBLICATIONS

Examination Report dated Feb. 9, 2015 for EP Application No. 08 867392.6.

Fifth Office Action mailed Jul. 30, 2015 for CN Application No. 200880121672.0.

* cited by examiner

METHOD AND APPARATUS FOR ACQUIRING CONTENT-BASED CAPITAL VIA A SHARING TECHNOLOGY

TECHNICAL FIELD

This invention relates generally to content management and rating systems.

BACKGROUND

Many people communicate with other people over the Internet and other networks in a social setting. For example, people often send media content, such as audio, video, or image files to other people within a social group or network because they think that those other people will enjoy the media content.

There is currently no way to automatically calculate who in a social group is a trendsetter, nor is there a way for people to know how much they have influenced others in their social circle by introducing them to new content. People want to know who they are influencing, and how much. Some technologies in use today attempt to let people know how much others value their musical or movie tastes by allowing people to rate the choices of other people. Current systems are, however, designed for people who do not know each other. Furthermore, in most sharing situations, people in one's social circle are not going to explicitly rate one another's choices every time a piece of content (such as music or video) is shared, nor will the person who originally gives the content have information about how many times the person forwarded the content to other people later on. In other words, current rating systems do not provide information about how much influence a particular person has on others in their social group, which is an indication of accumulation of content-based capital.

A recent study shows that many people want to know how much influence they have on the musical tastes of others. People also want to know who will most enjoy new music that they find and want to be introduced to new music by people within their social circle.

Most music systems today capture metadata for music content, such as the artist, album, and genre, and also track play history. There are systems in the art which assign a single score for a person in a social network to indicate influence on all people within that person's social network. This score is typically based on various criteria, such as recommendations and subsequent purchases, as well as other users' ratings of their choices. This score can indicate a general level of influence over all people in the social network, but it does not indicate an amount of influence that the person has over any individual person in the social network. This "amount" of influence is a variable score which can change not only between individuals but over time for the same individual, based on usage history and purchase behavior. In other systems utilizing influence scores, the scores are not calculated based on a person's amount of influence on their friend's friends, and there is no independent reciprocal score of the other's influence on them.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
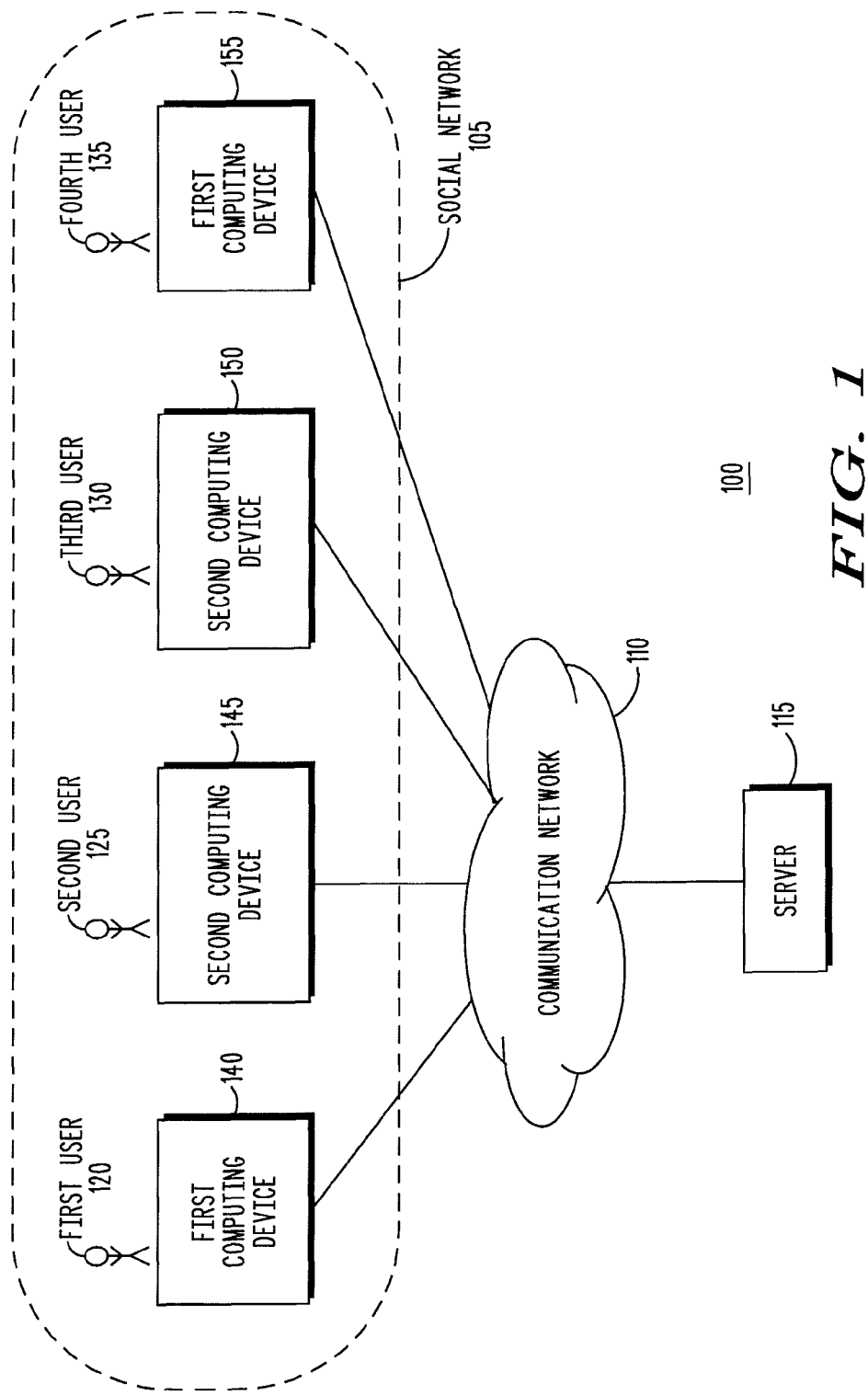
FIG. 1 illustrates a content management system according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method, system, and apparatus are provided for helping users of a social network to determine their level of influence on other members of a social network, based on usage of various media or other content. The social network may be an Internet-based social network. Alternatively, the users may interact via a different network, such as a proprietary wireless network or a hard-wired network, such as a cable network. Members of the network may designate the other members of their social network according to a group listing and may keep track of the other members via a visual representation that indicates the members in a particular user's social network or via a "buddy list," i.e., a listing of the group members.

The users each have the ability to send media content, a link to media content, or a suggestion/recommendation about media content, to other users within their social network. The media content may comprise media, such as music, video, or image files. The media content may also include pieces of content such as small clips of television shows or commercials. The media content may be encoded in a variety of formats such as, for example, Moving Picture Experts Group ("MPEG"), MPEG-1 Audio Layer 3 ("MP3"), or any other suitable format. When the media content, suggestion, or the link to the media content is transmitted, information corresponding to this transmission is stored in a network entity, such as a server, monitoring the social network. The information stored may include the name/identity of the media content, the format in which it is encoded, the sender and the recipient of the media content, as well as various information specific to the media content itself, such as an artist's name, a size of the content, genre, or any other information sufficient to categorize the content. Such characterizing information may be stored as metadata for the media content. For example, in the event that the media content is an audio file for the song "Beat It" by singer Michael Jackson, the song title and the name of the signer may be stored as metadata appended to the audio file.

Based on the recipient's use of the received media content, or suggestion or link, a determination can be made as to how much the recipient "likes" the content. For example, if the recipient plays/views the media content frequently or forwards the media content to other people, then it is assumed that the recipient likes the received media content. A "content capital" score is calculated for the link between the sender and the receiver, based on the receiver's use of the received media content. A different content capital score is calculated for each link between a particular user and every other user within that particular user's social network. The content capital scores may subsequently be shown to the user and, in some embodiments, to all members of the user's social network. Based on the content capital scores, the user can quickly determine his or her influence on the content usage of other users within the social network. In other words, the user can determine who likes the user's content the best, and may subsequently tailor the type of content sent to the other users in the social network based on this information. This interface provides an enjoyable way for users of the network to determine who is a "trendsetter" in terms of content selection.

FIG. 1 illustrates a content management system 100 according to at least one embodiment of the invention. The content management system 100 includes at least one social network 105, a communication network 110, and a server 115. The social network 105 is comprised of various users who communicate with each other, such as a first user 120, a second user 125, a third user 130, and a fourth user 135. (Those skilled in the art will recognize and understand that this number of users serves only in an illustrative capacity and that these teachings are readily scaled upwardly or downwardly to accommodate essentially any number of users.) The first user 120 may communicate via a first computing device 140, such as a computer, a personal digital assistant ("PDA"), cell phone, or any other electronic device capable of electronic communication. Similarly, the second user 125 may utilize a second computing device 145, a third user 130 may utilize a third computing device 150, and a fourth user 135 may utilize a fourth computing device 155.

The various users may communicate with each other via their respective computing devices. The users may send media content, such as audio files, video files, digital images, or any other type of media. For example, the first computing device 140 may send an audio file to the second computing device 145 via the communication network 110. The communication network 110 may comprise the Internet, a proprietary network, a wireless network, or any other suitable network capable of facilitating communication of the media content between two or more users of computing devices.

When the audio file is sent to the second computing device 145, the first computing device 140 may also send information/data to the server 115 to indicate the identity of the audio file that was transmitted, such as the name of the file, the length, and the time of transmission. Alternatively, the second computing device 145 may send this information to the server 115 upon receipt of the audio file. In either case, the server 115 is provided with information corresponding to the audio file transfer. The second computing device 145 also periodically transmits usage data to the server 115 to indicate how the second user 125 is utilizing the audio file. Information such as, for example, the number of times that the audio file has been played during within a recent time period, whether the audio file has been forwarded to other users, and whether the second user 125 has purchased audio files having similar metadata from, e.g., iTunes™, Napster™, Amazon.com™, or some other service selling media may be utilized to determine whether the second computing device 145 enjoys the audio file.

The various information is received by the server 115. The server 115 aggregates the received information and computes content capital scores. The aggregated usage information is evaluated via use of an algorithm that translates the various kinds of usage information into an expression of content capital. Once calculated, the content capital score is sent back to the first user 120 and displayed, to allow the first user 120 to evaluate his or her influence on the content listening/viewing and sharing habits of other users in the social network 105. The server 115 is discussed in more detail below with respect to FIG. 3.

Each time that the second user 125 plays or at least accesses the received audio file, information is sent to the server 115 to inform of the usage of the received audio file. In other embodiments, the information is queued in a memory of the second computing device 145 and then is periodically transmitted to the server 115 in an interval, such as once every few hours. In the event that the second user 125 decides to forward the received audio file to any other parties, information corresponding to this forwarding is sent to the server 115. The forwarding of the audio file may indicate that the second user 125 enjoys the audio file and therefore increases the content capital score for the link from the first user 120 to the second user 125. In some embodiments, the use of the audio file by the other parties who received the audio file from the second user 125 is tracked and can affect the content capital score for the link from the first computing device 140 to the second computing device 145. In other embodiments, only the mere fact that the audio file was forwarded to other entities is recorded.

Content capital scores are determined for each link between a particular user and every other user in the person's social network 105, as discussed below with respect to FIG. 2.

It should be also appreciated that although the embodiment of FIG. 1 is described in which each user utilizes only a single computing device, such as the first user 120 utilizing the first computing device 140, each user may also utilize additional computing devices associated with the user. For example, a desktop personal computer, a portable personal computer, an MP3 player, a PDA, and a cellular phone may all be computing devices 140 associated with the first user 120 and a transmission of media content to/from any of these computing devices may be monitored and included in the calculation for an overall score.

Figure 2:
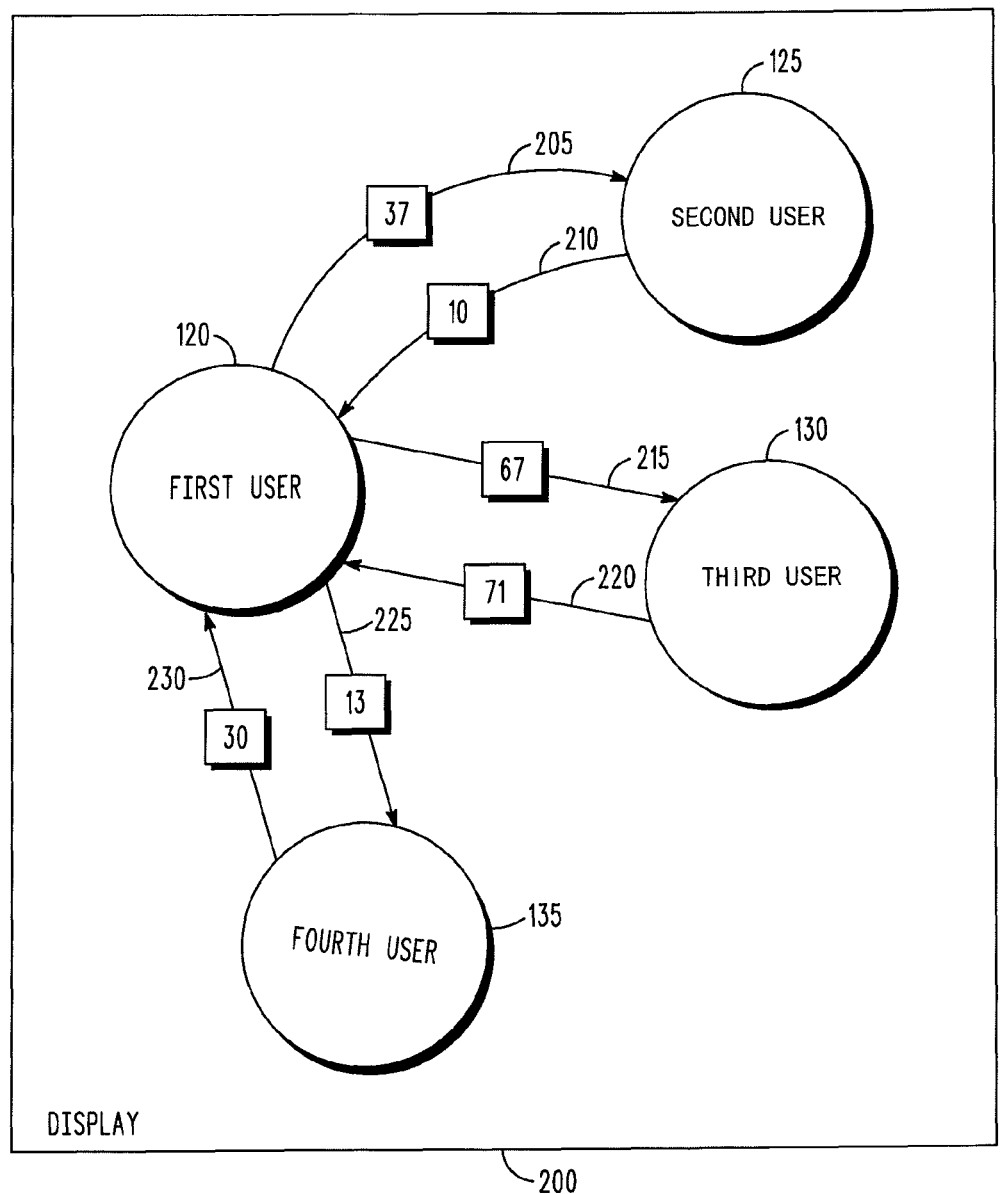
FIG. 2 illustrates a display for illustrating content capital scores in the first user's social network according to at least one embodiment of the invention.

FIG. 2 illustrates a display 200 for illustrating content capital scores in the first user's 120 social network 105 according to at least one embodiment of the invention. The display 200 may comprise an LCD display of a computer monitor, television screen, PDA, cellular telephone, or any other suitable display device. As shown, images/icons for all of the users in the first user's 120 social network 105 are displayed. In this case, images are shown that represent the second user 125, the third user 130, and the fourth user 135. Reciprocal links are shown between the first user 120 and each of the other users within the social network 105. Each of the links illustrates a content capital score to indicate how heavily the first user's 120 influence is on the other users in the social network 105, and vice-versa.

As shown, a first link 205 from the first user 120 to the second user has a content capital score of 37, and a second link 210 from the second user 125 to the first user 120 has a content capital score of 10. The content capital scores are determined based on a level of influence, where a higher score indicates the higher level of influence and a lower score indicates a lower level of influence. In some embodiments, a score of 50 indicates an average level of influence. In other embodiments, a lower score, such as 25, may indicate an average level of influence. The content capital scores may be determined according to any scale which can readily indicate a level of influence. In the example shown in FIG. 2, the score of 10 for the second link 210 indicates that the second user 125 has very little influence on the first user 120. This lower score generally indicates that the first user 120 does not enjoy the content sent by the second user 125 (or that the first user is already apprised of the content and has no need to further access the version forwarded by the second user). The second user 125 may utilize this score to determine that the first user 120 has different content tastes (and/or that the first user tends to be ahead of the second user with respect to identifying such content in the first instance) and therefore stop sending content to the first user 120 and instead concentrate efforts on sending content to other users who might enjoy the content more.

The first link 205 has a content capital score of 37 from the first user 120 to the second user 135. This score indicates that the fourth user 135 enjoys the content sent by the first user 120 more than the first user enjoys the content sent by the fourth user 135. However, the score of 37 may still indicate that the fourth user 135 has a lower than average level of enjoyment of the content sent by the first user 120. The first user 120 may determine, based on this content capital score, that the fourth user 135 does not have a high level of enjoyment of the content sent by the first user 120 and may subsequently tailor the content being sent. In some embodiments, the content capital scores may be enjoyable to view and the first user 120 may tailor the content sent to users in the social network 105 in an effort to increase the content capital scores, as part of a social interaction game.

There are also reciprocal links between the first user 120 and the third user 130. As shown, a third link 215 exists from the first user 120 to the third user 130 and indicates a content capital score of 67. A fourth link 220 extends from the third user 130 to the first user 120 and indicates a content capital score of 71. There is a relatively high level of influence between the first user 120 and the third user 130, as reflected in the content capital scores that exceed 50. The third user 130 has slightly greater influence on the first user 120, than the first user 120 has on the third user 130, as indicated by the content capital score for the fourth link 220, i.e., 71, that is greater than the content capital score of the third link 215, i.e., 67.

A fifth link 225 extends from the first user 120 to the fourth user 135, and indicates a content capital score of 13. A sixth link 230 extends back from the fourth user 135 to the first user 120 and indicates a content capital score of 30. Accordingly, while neither the first user 120 nor the fourth user 135 have much influence on each other, the fourth user 135 has slightly more influence on the first user 120, than does the first user 120 has on the fourth user 135, as evidenced by the larger content capital score of 30 shown in the sixth link 230, versus the content capital score of 13 shown in the fifth link 225.

FIG. 2 illustrates only the social network 105 for the first user 120. However, a person of ordinary skill in the art would readily appreciate that these teachings can be expanded to permit the display of additional users not within the first user's 120 social network 105. In some embodiments, the second user 125, the third user 130, and the fourth user 135 may include additional users in their own respective social networks, such as a fifth user, a sixth user, as well as potentially many more users. In some embodiments, all of the users within the first user's 120 social network 105 are displayed. In additional embodiments, more users that are not in either the first user's social network 105 or the respective social networks of the other users within the first user's social network may be displayed. Additional embodiments may display users to whom a user in the first user's 120 social network 105 have forwarded a copy of an electronic media file that originated with the first user 120.

Alternative embodiments may display only those users within the first user's 120 social network 105 for which the reciprocal links have a content capital value exceeding a designated minimum threshold value, such as, for example, a low threshold value of 15. This may serve to simplify the display of the first user's 120 social network 105 in the event that the first user 120 has a large number of users within the social network 105.

Other embodiments may have different user interfaces. For example, instead of showing an exact score, there can be bubbles of influence showing on the screen, with people who have the most influence on others in their social network showing up as a larger bubble, or a different color bubble. It would also be possible to have their names in different colors and sizes (again, without indicating exact scores). There are, in fact, many alternative user interfaces that could display this kind of data in unique and interesting ways.

In some embodiments, the first user 120 has to manually add a particular user, such as the second user 125, to the social network 105 in order to calculate the content capital scores. In other embodiments, all users to whom the first user 120 has either sent or from whom the first user 120 has received one or more electronic media content files within a certain time period are automatically added to the social network 105. Users may also be given the opportunity to "opt out" of the social network 105 in the event that they do not want their use of electronic media content to be tracked. In some embodiments, users have to specifically "opt in" in order for their use of the electronic media content to be tracked.

Figure 3:
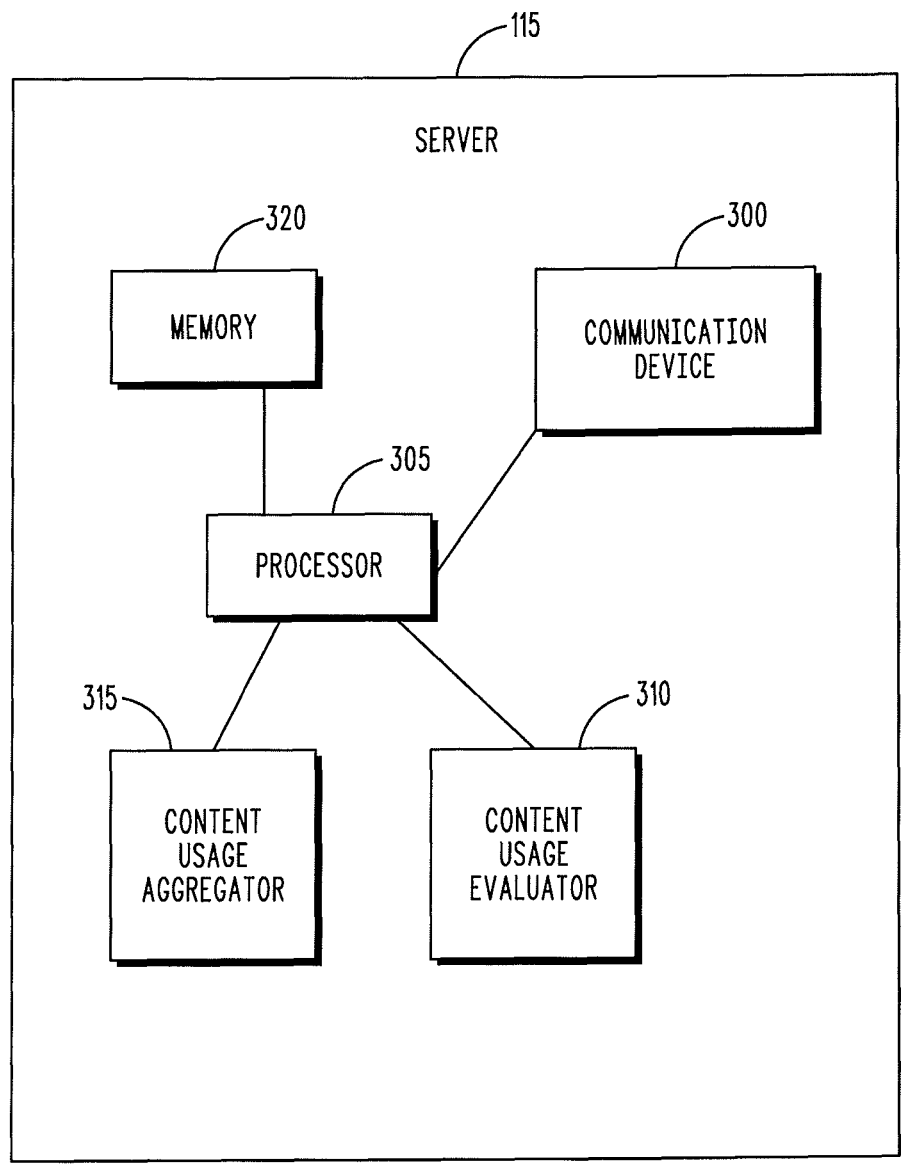
FIG. 3 illustrates the server according to at least one embodiment of the invention.

FIG. 3 illustrates the server 115 according to at least one embodiment of the invention. The server 115 may include several components, such as a communication device 300, a processor 305, a content usage evaluator 310, a content usage aggregator 315, and a memory 320. In the event that information pertaining to usage of content sent by the first user to any of the other users in the social network 105, the usage of the content by the recipients is utilized to determine the content capital scores.

For example, as discussed above with respect to FIG. 1, each time that a user in the first user's 120 social network 105 plays or at least accesses a content file, such as an audio file, received from the first user 120, information is sent to the server 115 to inform of the use of the received audio file. In other embodiments, the information is queued in a memory of an electronic device associated with the recipient user and then is periodically transmitted to the server 115 at an interval, such as once every few hours. This information may be received by the communication device 300 of the server 115 and then aggregated by the content usage aggregator 315. The communication device 300 may comprise a modem. As the information is aggregated, it may be stored in the memory 320 and/or sent to the content usage evaluator 310, which determines the content capital score for the link between the first user 120 and the recipient user based on the recipient user's usage of the content.

In the event that the recipient user forwards the received audio file to any other parties, information corresponding to this forwarding is sent to the server 115. The forwarding of the audio file may indicate, for example, that the second user 125 enjoys the audio file and therefore increases the content capital score for the link from the first user 120 to the second user 125. In some embodiments, the use of the audio file by the other parties who received the audio file from the second user 125 is tracked and can affect the content capital score for the link from the first user 120 to the second user 125. In other embodiments, only the mere fact that the audio file was forwarded to other entities is recorded.

Content capital scores are determined for each link between a particular user and every other user in the person's social network 105, as discussed above with respect to FIG. 2. The content usage evaluator 310 utilizes an algorithm that translates the various kinds of usage information into an expression of the content capital. Once calculated, the content capital score is sent back to the first user 120 and displayed, to allow the first user 120 to evaluate his or her influence on the content listening/viewing and sharing habits of other users in the social network 105.

There are several components utilized according to the teachings discussed herein. The system aggregates usage information, determines a value/values for content capital between people/social networks, and then passes the calculated value/values back to users or to operators.

Tracking of the content usage can be accomplished by attaching a unique ID to each content file the first time it is accessed by a user. Then, every time the content is played, the unique ID is reported along with the user ID of the user who played the content. When content is forwarded to other users, the unique ID is actually what is sent to the recipient when the content is forwarded so that the giving relationship is preserved. The recipient will then receive their own unique ID for the content to be used in the future. The server 115 will log the following sets of information:

1) Play—userID, songID, uniqueID, timestamp
2) Forward—userID[sender], userID [recipient], songID, uniqueID[sender], uniqueID[recipient], timestamp
3) Purchase—userID, songID, uniqueID, timestamp In order to determine content capital, queries are performed on this logged data in order to determine a value (or multiple values) representing the content capital between two people. This can be calculated in many ways using all of the information available. For example, weights could be applied to the time since an item was shared or different weights could be applied to various ways an item was used (played, sent, burned, etc.). The weight of each use can be inversely proportional to the time since that use, as a way to account for changes in usage patterns over time. Weights can also be applied so that users that are multiple links away in a social network get less weighting, as they are more links away.

Figure 4:
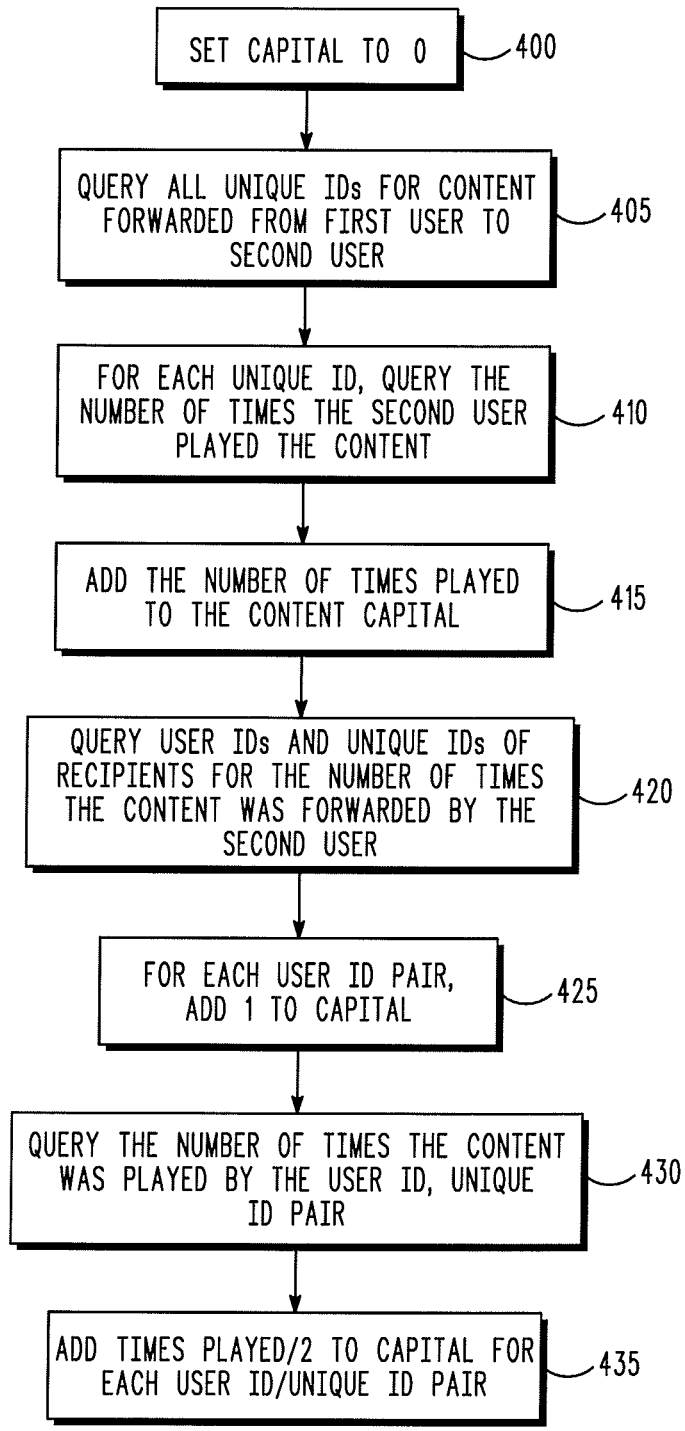
FIG. 4 illustrates an exemplary implementation to determine the content capital of the first user based on the usage of the content by the second user according to at least one embodiment of the invention.

FIG. 4 illustrates an exemplary implementation to determine the content capital of the first user 120 based on the usage of the content by the second user 125 according to at least one embodiment of the invention. First, at operation 400, the content capital for the link from the first user 120 to the second user 130 is set to 0. Next, all uniqueIDs are queried for content forwarded from the first user 120 to the second user 125 at operation 405. For each uniquedID, a query of the number of times that the second user 125 played the content is performed at operation 410. At operation 415, the number of times that the content was played is added to the content capital for the link. Next, at operation 420, userIDs and uniqueIDs of recipients of the content are queried to determine the number of times that the second user forwarded the content to other users. For each (userID, uniqueID) pair, a value of 1 is added to the content capital at operation 425. The number of times that the content was played by the (userID, uniqueID) pair is queried at operation 430. Finally, at operation 435, the number of times that the (userID, uniqueID) pair played the content is divided by a factor of 2 and added to the content capital score.

The method of FIG. 4 illustrates one example of how to calculate the content capital score. It should be appreciated that different weights could be assigned to the number of times that the media content was played by the second user 125, or the number of times that the song was played by the other users receiving the content from the second user. Moreover, in some embodiments, the number of times that content was forwarded to additional levels of users (i.e., from the users who received the content from the second user) may also be assigned a weight.

This value for content capital can then be explicitly requested by the first user 120 to see which of his or her contacts in her social network 105 provide the most content capital (in other words, to see on whom the user has the most influence). It can also be used to determine whether a new media content in the first user's 120 collection should be automatically sent to the second user 125 (if the second user 125 has a high value of content capital for similar content). In this case, the query in the first step of the above algorithm could be for media content in the same genre or by the same artist or list of similar artists as defined in the known art.

It is should be appreciated that a central server 115 is not necessary in some embodiments, and that the same results can be produced using swarm-like data transfer between nodes. In this implementation, each user would have their own usage aggregator and usage evaluator. Upon accessing content file originating from the first user 120, the content aggregator for the person accessing the content would send aggregated data to the first user's 120 content evaluator (to provide the first user 120 with their capital/influence model). In the event that the second user 125 had forwarded the content to a fifth user, the fifth user's content aggregator would send aggregated data to the second user's content evaluator, and then the second user's content aggregator would sent the aggregated usage data to the first user's content evaluator. The first user would then have access to the fifth person's usage information, routed through the second user instead of through a central server 115.

Content capital can be associated not only with a person, but can be pulled apart to provide capital/influence information about a person's recommendation/provision of types of content, so not only might the first user 120 end up with a high influence score with the second user 1125 and a low influence score with the third user 130, the first user 120 might also end up with a high influence score with the second user 125 for Indy Rock, but a low influence score with the second user 125 for Folk music.

The procedure described above can be computed to any depth n. Users can maintain caches of previously queried capital requests and also contain "dirty" bits to indicate that usage has occurred and their capital has to be recalculated. In this case, upon new usage history occurring, the server 115 (or client in the distributed version described above) would update (or inform) all of the users in their social network that their information is out of date and must be recalculated the next time the values are requested. Both of these mechanisms will help to reduce complexity of the calculations without drastically reducing the accuracy (since users at farther depths can have lower weights).

In a distributed implementation, clients may maintain their own content capital calculations and can query clients "downstream" in the social network 105 in order to obtain the values for the calculation listed above. Clients could aggregate usage history for a given user as content is used, or all clients of a given user could collaborate to determine aggregate usage when one of the devices is queried. The calculation would take the form of the one above, with each successive layer deeper into the social network being a distributed calculation on each client device aggregated by a device in the next higher level of the social network.

In either the server-based or distributed implementation, calculations performed to determine the social capital between users can be used to automatically determine whether or not a piece of content should "stay" in a particular collection or move to another collection. This provides an automatic and ambient way to transfer media content, not based on either a solely push or a pull model, but instead on a collective intelligence model. In this case, the content moves to the "best" location (the "best" being determined by things such as how often this person has been influenced to buy similar artists after being introduced to a new song or how often they have played similar media content in the past after being introduced or how often past agents have found a path to someone with high content capital through this person as a node). This last possibility would allow the content to travel autonomously (and automatically) through a network of people, finding the shortest path to people with highest content capital by calculating each person's content capital and the capital of their friends (based on past activities of other agent/content combinations). The content capital calculations thus contain an embedded "history" or "trail" indicating influence (based on evaluation calculations) of each person in that user's social network, and in the future would use this encoded "scent" to determine future paths of high activation.

The algorithms implemented for determining content capital allow evaluation calculations for each person in the network, allowing additional information to be included in what could be very complex algorithms for determining capital/influence. Indeed, it is possible to imagine weighting the play count (and forwarding and purchasing) of someone who already has a lot of content capital higher than the play count of someone with little content capital. This would result in an increasingly complex algorithm fine tuning the representation of the degree of musical (or other media type) influence one has. The algorithm calculates influence and provides that information to users along with the ability to either 1) give the users the option to decide on how to share content in the future based on that information, or 2) automatically share content based on calculations of influence or 3) determine who, in a social group, has the most content-based influence on others in their social group. The content capital scores are calculated per person in a dyadic network, where different scores per dyadic couple are provided vs. one aggregate score.

Figure 5:
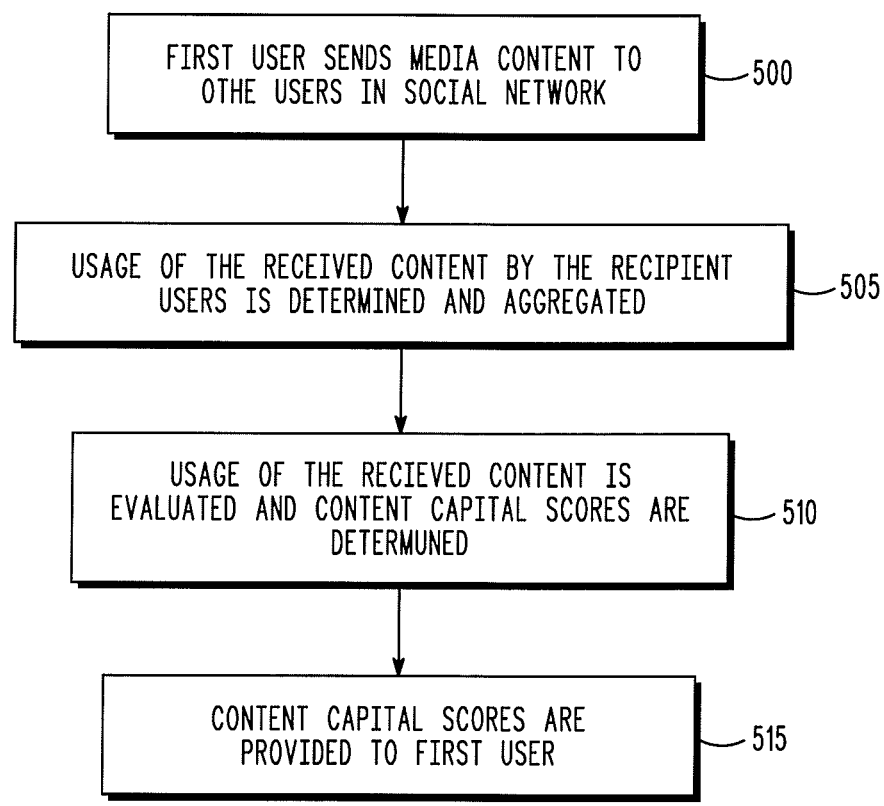
FIG. 5 illustrates a method determining and displaying content capital scores according to at least one embodiment of the invention.

FIG. 5 illustrates a method determining and displaying content capital scores according to at least one embodiment of the invention. First, at operation 500, the first user 120 sends media content, or a link to the media content, to other users in a social network 105. Next, the usage of the received content by the recipient users is determined and aggregated at operation 505. At operation 510, usage of the received content is evaluated and content capital scores are determined. Finally, at operation 515, the content capital scores are provided to the first user 120 for viewing on the display.

Figure 6:
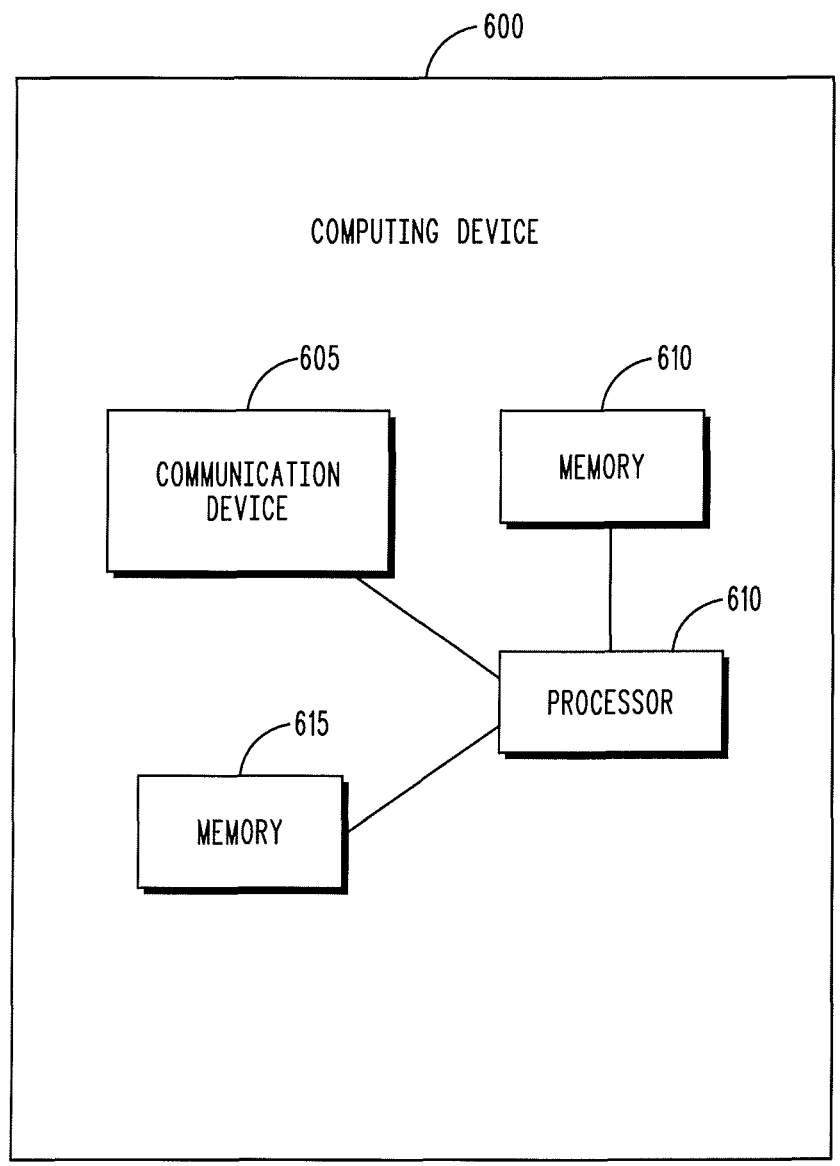
FIG. 6 illustrates a computing device according to at least one embodiment of the invention.

FIG. 6 illustrates a computing device 600 according to at least one embodiment of the invention. The computing device 600 many be one of several computing devices associated with a user of a social network, such as one of the users shown in FIG. 1. As shown, the computing device 600 includes several elements, such as a communication device 605, a memory 610, a processor 610, and a display 615. The communication device 605 may comprise a modem or any other element capable of sending and receiving an electronic communication, such as a media content file. The memory 610 stores media content and may also store program code to be implemented by the processor 610. The display 615 is utilized to display a social network with capital content scores, such as the one shown in FIG. 2.

The teachings discussed herein are directed to a method, system, and apparatus are provided for helping users of a social network to determine their level of influence on other members of a social network, based on usage of various media or other content. The users each have the ability to send media content, or a link to media content, to other users within their social network. When the media content or the link to the media content is transmitted, information corresponding to this transmission is stored in a network entity, such as a server, monitoring the social network.

Based on the recipient's use of the received media content, a determination can be made as to how much the recipient "likes" the content. For example, if the recipient plays/views the media content frequently or forwards the media content to other people, then it is assumed that the recipient likes the received media content. A "content capital" score is calculated for the link between the sender and the receiver, based on the receiver's use of the received media content. A different content capital score is calculated for each link between a particular user and every other user within that particular user's social network. The content capital scores (or visual or audio or audio-visual representations of these scores) may subsequently be shown/provided to the user and, in some embodiments, to all members of the user's social network. Based on the content capital scores, the user can quickly determine his or her influence on the content usage of other users within the social network. In other words, the user can determine who likes the user's content the best, and may subsequently tailor the type of content sent to the other users in the social network based on this information. This interface provides an enjoyable way for users of the network to determine who is a trendsetter in terms of content selection.

The teachings discussed herein provide significant consumer benefits. It makes it possible for people to see how much they have influenced the media content experiences of others, and therefore how much content capital they are gaining with particular people when sharing content with them. It also makes it possible for people to gauge the interest of others in music and other content they have shared, without requiring those others to explicitly rate the music or other content. This, too, is something quite different from how people learn about what others think of their media content tastes today.

The teachings discussed herein allow carriers or music providers (especially subscription music services) to track what music spreads, to whom, and how quickly, thus allowing them to forecast trends and trendsetters. This would be very valuable to them, as marketers are always looking for the best way to anticipate trends or at least detect them very early on, as they are also eager to determine the trendsetters. This is true for other content providers as well, such as cable television operators who wish to know who recommends programming, and how well the programming is being received.

Furthermore, the teachings discussed herein also allow the tracking of user information that could be useful for other future applications and technologies. Such teachings provide unique user experiences and helps people fill a basic human need: the desire to be respected and influential. As people learn who is influenced, and how much, by the media content they share with them, they will want to share more media content with these people, thereby increasing their content capital. Furthermore, many companies who sell products to consumers want to know "what's hot" and "what's next." These teachings may provide the entertainment industry with the ability to determine that with greater accuracy and surety. This may be worth quite a bit, for example, to anyone interested in trends in music, movies, television, etc. (even user-generated content) and determining the trendsetters in content consumption.

Furthermore, currently people thinking of sharing content or providing information about shared content are not looking at already formed social groups. This, however, is inevitable as more and more "sharing between strangers" applications find little use in the market.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
   monitoring by a computing device a first transfer of media content or a link to the media content, from a first user to a second user;
   the computing device determining a first content capital score between the first user and the second user based on how many times the second user forwarded the media content or the link received from the first user and how many times the media content was viewed or played by the second user, wherein different weights are assigned to a number of times that the media content was viewed or played, the first content capital score being an indication of the first user's influence over the second user;
   the computing device forwarding the first content capital score to the first user so that the first user has the indication of the first user's influence over the second user;
   monitoring by the computing device a second transfer of media content or a link to the media content, from the first user to a third user;
   the computing device determining a second content capital score between the first user and the third user based on how many times the third user forwarded the media content or the link received from the first user and how many times the media content was viewed or played by the third user; and
   the computing device forwarding the second content capital score to the first user so that the first user has indication of the first user's influence over the third user.

2. The method of claim 1, wherein the first content capital score is additionally based on monitored use of the media content by additional users.

3. The method of claim 1, wherein the monitoring the first transfer, and determining the first content capital score is performed by a server in a social network.

4. The method of claim 1, wherein the media content comprises at least one of a music file, a video file, and an image file.

5. The method of claim 4, wherein the video file comprises at least one of a television clip and a commercial content clip.

6. The method of claim 1, further comprising assigning a unique identifier to the media content and, in response to the media content being accessed by a user, reporting the unique identifier and a user identifier of the user.

7. The method of claim 6, wherein the unique identifier and the user identifier are reported to the first user.

8. The method of claim 1 wherein the weight assigned to each time that the media content was viewed or played is inversely proportional to an amount of time since the media content was viewed or played.

9. The method of claim 1 wherein the weight assigned to a first number of times that the media content was viewed or played is different than the weight assigned to a second number of times that the media content was viewed or played.

10. A server, comprising:
    one or more processors;
    a non-transitory computer-readable medium comprising instructions that when operated upon by the one or more processors cause the one or more processors to:
    receive data corresponding to a transfer of a media content or a link to the media content, from a first user to a second user;
    receive data as to whether the media content has been forwarded by the second user to other users and how many times the media content was viewed or played by the second user;
    determine a content capital score for the first user based on how many times the second user forwarded the media content or the link to the media content received from the first user and how many times the media content was viewed or played by the second user, wherein different weights are assigned to a number of times that the media content was viewed or played, and the content capital score being an indication of the first user's influence over the second user; and
    transmit a representation of the content capital score to the first user so that the first user has the indication of the first user's influence over the second user.

11. The server of claim 10, wherein the media content comprises at least one of a music file, a video file, and an image file.

12. The server of claim 10, wherein the instructions cause the one or more processors to modify the content capital score based on use of the media content by additional users receiving the media content from the second user.

13. The server of claim 10, wherein the weight assigned to each time that the media content was viewed or played is inversely proportional to an amount of time since the media content was viewed or played.

14. The server of claim 10 wherein the weight assigned to a first number of times that the media content was viewed or played is different than the weight assigned to a second number of times that the media content was viewed or played.

15. The server of claim 10 wherein the weight assigned to the number of times that the media content was viewed or played is a multiple of the number of times that the media content was viewed or played.

16. A computing device, comprising:
    a memory to store media content;
    a processor to play the media content; and
    wherein the memory comprises instructions that are executable by the processor to performs steps, comprising:
    transmit the media content from a first user to a second user of a social network, transmit information to a server on whether or not the media content was transmitted from the first user to the second user of the social network and how many times the media content was viewed or played by the second user, receive a content capital score from the server that is based on how many times the second user forwarded the media content or link received from the first user and how many times the media content was viewed or played by the second user, wherein different weights are assigned to a number of times that the media content was viewed or played, and wherein the content capital score is between the first user and the second user and indicates the first user's influence over the second user; and display, to the first user, on a user interface, the content capital score determined based on whether the media content has been forwarded by the second user to other users and how many times the media content was viewed or played by the second user.

17. The computing device of claim 16, wherein the processor is adapted to monitor the first user's usage of the media content.

18. The computing device of claim 16, further comprising a display, wherein the user interface is displayed to the first user on the display.

19. The computing device of claim 16, wherein the weight assigned to each time that the media content was viewed or played is inversely proportional to an amount of time since the media content was viewed or played.

20. The computing device of claim 16, wherein the weight assigned to a first number of times that the media content was viewed or played is different than the weight assigned to a second number of times that the media content was viewed or played.

* * * * *